Patented Jan. 7, 1936

2,027,351

UNITED STATES PATENT OFFICE 2,027,351

PROCEDURE FOR THE MANUFACTURE OF CONDENSATION PRODUCTS

Walther Schrauth, Berlin-Dahlem, Germany, assignor to Deutsche Hydrierwerke Aktiengesellschaft, Berlin-Charlottenburg, Germany, a corporation of Germany No Drawing. Application October 26, 1933, Serial No. 695,325. In Germany October 28, 1932

10 Claims. (Cl. 260—8)

For the manufacture of synthetic resin-like condensation products of same nature as the so-called alkyd-resins or "Glyptal" resins, obtainable by the condensing of polyhydric alcohols with polybasic acids, if necessary with or without incorporation of other reacting ingredients, such as fatty oils or their acids, one employs principally glycerine or glycol respectively as polyvalent alcohols.

Now it has been found that such condensation products of polybasic acids and polyvalent alcohols show remarkably better properties in replacing entirely or partially the hitherto employed low molecular, polyvalent, saturated alcohols by those polyvalent alcohols which, on the one hand, contain more than 8 carbon-atoms in the molecule and are derivable from higher molecular soap-forming fatty acids, while on the other hand they are of an unsaturated character so that they contain double bonds. Such unsaturated, polyvalent higher molecular alcohols of the aliphatic series which are to be used according to the present procedure, are in first line the ricinoleyl alcohol obtainable by the reducing of castor oil or of the castor oil fat acid and consisting principally of dioxyoctadecene. Also in reducing grape seed oil one obtains a well suitable fatty alcohol mixture of an unsaturated character which contains bivalent alcohols. Finally the mixture of high unsaturated fatty alcohols obtainable from the reduction of linseed-oil can be converted by the addition of water into polyvalent unsaturated high molecular fatty alcohols which are suitable for the manufacture of condensation products of the sort of alkyd resins.

Also in this case it is allowed to employ as polybasic carbon acids any aromatic, aliphatic or hydroaromatic polyvalent carbon acids as already proposed for the manufacture of synthetic resins, therefore phthalic acid, phthalic anhydride, hexahydrophthalic acid, succinic acid, adipic acid, fumaric acid, maleic acid, citric acid, tartaric acid, oxalic acid etc. The said acids may be used alone or conjointly as a mixture; hereby it is advantageous to co-employ besides poly-basic aromatic dicarbon acids simultaneously aliphatic, polybasic carbon acids, such as succinic acid, adipic acid or tartaric acid. Moreover they may likewise be used according to well-known methods together with monobasic saturated or unsaturated higher molecular fatty acids.

The proportion of the employed primary materials can be changed within rather large limits and it depends upon the degree of the desired elasticity of the condensation products according to how one chooses the composition of the charge. The manufacture of the resin may be accomplished according to the method hitherto in use and it is allowable to add during the true esterification process substances which are in use as additional materials with the methods hitherto known. Thus, for an example, it is practicable to employ organic metal compounds, small amounts of sulfuric acid and the like in order to accelerate the esterification and in the same way filling and colouring matters or the like may be added to the mixture of the components or of the finished resins. Furthermore it is possible to perform under many different conditions the reaction which occurs in heating the components. Thus, for example, one may continuously increase the temperature during the heating or produce the condensation also by a gradual heating. The manufacture of the primary wax-like esterification products is done by heating for several hours at higher temperatures of about 100–220° C., whereas the transforming into the resin-like state is accomplished by heating for several days at temperatures of 120–180°. The applied temperatures and heating periods depend upon the chosen primary materials and proportions.

Example 1

By weight 200 parts of ricinoleyl alcohol and 240 weight parts of succinic acid are heated in increasing slowly the temperature up to approximately 120°; the mixture is then kept at this temperature for some hours, whereupon one heats for two further hours up to 160°. One obtains thus a resin-like, balm-like product. If one continues to heat the obtained resin for a sufficient long time (say some weeks) up to 120° to 130°, it will be less soluble and it grows hard, though it distinguishes itself by a remarkable elasticity.

Example 2

By weight 200 parts of a mixture containing phthalic anhydride and adipic acid in a proportion of 4:1, are slowly heated conjointly with 100 weight parts of ricinoleyl alcohol up to the melting point. When the development of aqueous vapour is finished the temperature is increased during a period of eight hours up to about 140°. Now one continues to heat until the obtained condensation product will be converted from the wax-like state into the resin-like state. The result is a product which, though being very hard, is of a surprising good elasticity.

Example 3

By weight 100 parts of ricinoleyl alcohol, to which one adds equal parts of glycerine, are heated together with 300 weight parts of phthalic anhydride up to 125–130° until the development of reaction water has ceased. Then one continues to heat for several days at a temperature of 130–140°. The result is a light brown, solid but very elastic resin.

What I claim is:—

1. Procedure for the manufacture of condensation products, comprising the heating of poly-basic carbon acids and ricinoleyl alcohol (dioxyoctadecene).

2. Procedure for the manufacture of condensation products, comprising the heating of poly-basic carbon acids and fatty alcohol mixtures obtainable by the reduction of grape seed oil.

3. Procedure for the manufacture of condensation products, comprising the heating of poly-basic carbon acids and fatty alcohol mixtures obtainable by partial addition of water to the unsaturated fatty alcohols obtained by the reduction of linseed oil.

4. Procedure for the manufacture of condensation products, comprising the heating of poly-basic carbon acids, ricinoleyl alcohol (dioxyoctadecene) and glycerine.

5. Procedure for the manufacture of condensation products, comprising the heating of phthalic acid, adipic acid and ricinoleyl alcohol.

6. Procedure for the manufacture of condensation products, comprising the heating of phthalic anhydride, succinic acid, ricinoleyl alcohol and glycerine.

7. As a product of manufacture, an elastic resin-like product consisting of a condensation product of phthalic anhydride, ricinoleyl alcohol and glycerine.

8. As a product of manufacture, a resin-like product consisting of a condensation product of phthalic anhydride, adipic acid and ricinoleyl alcohol.

9. Procedure for the manufacture of condensation products, comprising the heating of poly-basic carbon acids and alcohol of the group consisting of ricinoleyl alcohol and the polyvalent unsaturated alcohol obtained by reduction of grape seed oil and the polyvalent unsaturated alcohols obtainable by partial addition of water to the unsaturated fatty alcohols obtained by the reduction of linseed oil.

10. As a product of manufacture, an elastic resin-like product consisting of a condensation of a poly-basic carbon acid and alcohol of the group consisting of ricinoleyl alcohol and the polyvalent unsaturated alcohols obtained by reduction of grape seed oil and the polyvalent unsaturated alcohols obtainable by partial addition of water to the unsaturated fatty alcohols obtained by the reduction of linseed oil.

WALTHER SCHRAUTH.